Dec. 1, 1925.
R. GUASTAVINO
1,563,846
SOUND ABSORBING PLASTER AND METHOD OF APPLYING SAME
Filed Sept. 23, 1925
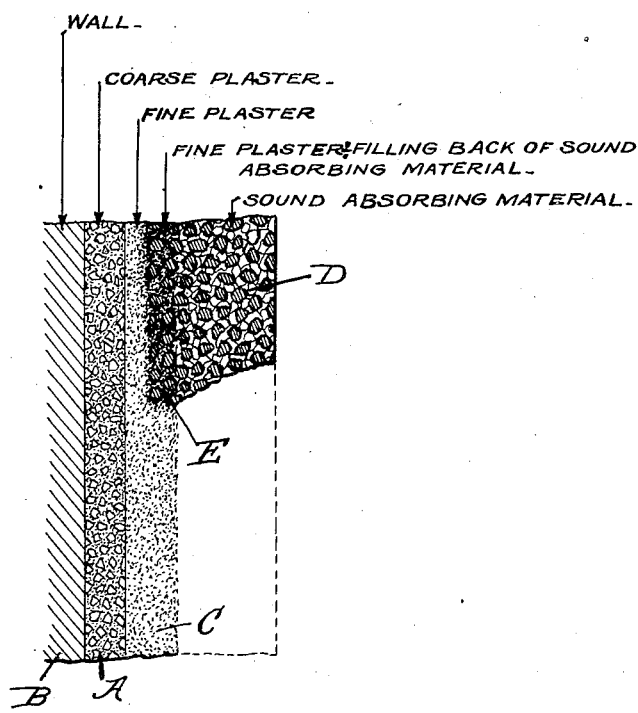
Inventor
*Rafael Guastavino,*
By *S. P. Wolhaupter.*
*his* Attorney
Witnesses:

Patented Dec. 1, 1925.

1,563,846

UNITED STATES PATENT OFFICE.

RAFAEL GUASTAVINO, OF BAY SHORE, NEW YORK, ASSIGNOR TO R. GUASTAVINO CO., OF NEW YORK, N. Y., A CORPORATION OF MASSACHUSETTS.

SOUND-ABSORBING PLASTER AND METHOD OF APPLYING SAME.

Application filed September 23, 1925. Serial No. 58,147.

*To all whom it may concern:*

Be it known that I, RAFAEL GUASTAVINO, citizen of the United States, residing at Bay Shore, in the county of Suffolk and State of New York, have invented certain new and useful Improvements in Sound-Absorbing Plasters and Methods of Applying Same, of which the following is a specification.

The present invention contemplates an improvement in the sound absorbing material covered by the reissue patent granted jointly to W. C. Sabine and the present applicant, No. 14,992, dated November 23, 1920, and to a novel method of applying the same as a plaster for facing walls and ceilings in auditoriums and the like where it is important to provide and maintain proper acoustical conditions.

According to the invention of the reissue patent the sound absorbing material therein described and claimed essentially consists of particles of body material, preferably graded to approximately uniform size and bonded to each other at their points of contact with suitable cementing material, the result being a physical structure providing pores which inter-communicate and openly penetrate the exposed surface and possess the property of absorbing a very large percentage of the characteristic sounds which distinguish articulate speech. The present invention provides for better adapting this material for use as a plaster by somewhat changing the characteristics of its physical structure through a new mode of applying the material. Thus, there are two phases to the present invention, namely, (1) a novel way of applying acoustical material as a plaster to walls and ceilings and, (2) an improved product resulting from this new method of application.

With these and other objects in view which will more readily appear as the particulars of the invention are better understood, the same consists in the novel features hereinafter more fully described, illustrated and claimed, and by way of one example of the carrying out of the invention the figure of the drawing illustrates a section of wall built up according to the invention.

It will be understood that it is important in carrying out the present invention that the sound absorbing material does not have associated therewith any ingredients or materials that would tend to close the pores and intercommunicating channels and thereby prevent the sounds from penetrating and be absorbed in the pores by expansion and contraction and also due to friction. Accordingly, it is the purpose and intent of the present invention to maintain all of the desirable characteristic structural features of the sound absorbing material of the reissue patent referred to while at the same time to use the same in a manner that will improve its acoustical effect and render it available for application by a plasterer in the ordinary course of his work. To that end the following process steps are observed in using the acoustical plaster material in accordance with the present invention:

First, the usual "scratch" or ground coat of plaster designated in the drawing by the numeral A is applied to the face of the supporting base B, which supporting base is a wall or ceiling or the ordinary form of lathing used in connection therewith. This "scratch" or ground coat A of plaster is usually termed the rough plaster coat on the wire lath wall or ceiling, and as distinguished from applying the last or finishing coat directly to this ground or rough coat A the present invention introduces and employs the novel step of applying over the face of the ground coat A a comparatively thin coat of binding material C which is preferably a very rich mixture of plastic material such as hydrated lime with a very small quantity of sand and mixed with water to the proper consistency. While this plastic coat C of binding material is still very soft the plasterer immediately covers the same by troweling with a finishing coat D of porous acoustical material preferably of the physical form and characteristics as the sound absorbing material covered by the reissue patent above referred to.

In applying the finishing coat of porous acoustical material it is troweled with sufficient pressure so as to be crowded into the soft coat of binding material C thereby becoming intermingled and mixed therewith.

Therefore, it will be seen that the resulting physical structure is a combination of the porous acoustical material D and the rich fatty binder of the plastic coat C. In this resulting structure the porosity on the finished exposed surface remains wholly open for a depth of 3/8" to 1/2", and then the porosity decreases and the pores become smaller on account of the plastic binder C filling into the same at the back of the finishing coat of acoustical material. The effect here produced is to have the large pores in the outer exposed surface of the wall or ceiling and the finer pores farther in the interior, the porosity diminishing toward the back until finally porosity practically ceases. This gives the distinct advantage that where the large porosity occurs on the outer exposed surface it has the tendency to absorb a larger percentage of sound waves of low pitch and the finer porosity toward the back absorbing sound waves of high pitch. Accordingly, it will be seen that the present invention provides the combination of a plastic binder with porous acoustical material of substantially graded grains so that there is produced as at E a zone between these two materials where the size of the pores has been gradually diminished until they become nil, with the added advantage of the plastic coat of binding material C providing a means whereby the porous acoustical material D may be successfully combined with "scratch" or ground coat of plaster and at the same time improve and maintain the acoustical properties of the wall or ceiling.

I claim:—

1. An acoustical wall or ceiling structure including a coat of binding material and a finishing coat of porous acoustical material intermingled at its back therewith forming a zone between the two coats of diminishing porosity.

2. An acoustical wall or ceiling structure including a coat of binding material and a finishing coat of porous acoustical material having approximately uniform porosity intermingled at its back therewith forming a zone between the two coats of diminishing porosity.

3. A method of applying acoustical plaster to walls and ceilings which consists first in applying the usual ground coat of plaster to the usual base, then covering the ground plaster coat with a layer of plastic binding material, and subsequently applying under pressure a finishing coat of porous acoustical material to the said binding material while the latter is in a soft condition causing the back part of the acoustical material to penetrate and combine with the plastic binding material.

4. A method of applying acoustical plaster to walls and ceilings which consists first in applying the usual ground coat of plaster to the usual base, then covering the ground plaster coat with a layer of plastic binding material, and subsequently applying under troweling pressure a finishing coat of porous acoustical material having approximately a uniform porosity, causing said acoustical material to penetrate the plastic binding material forming an intermediate zone of diminishing porosity.

In testimony whereof I hereunto affix my signature.

RAFAEL GUASTAVINO.